Figure 6:
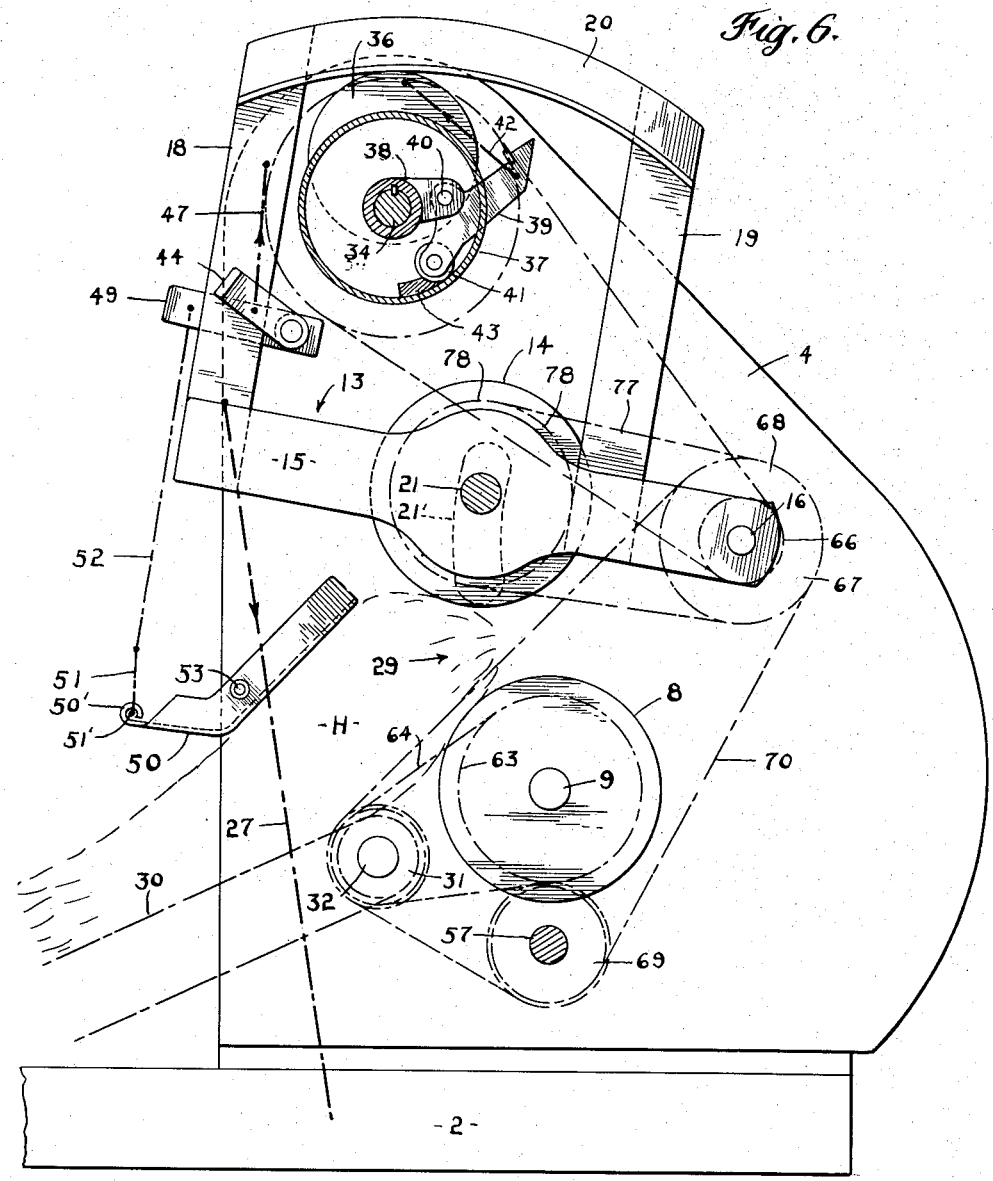

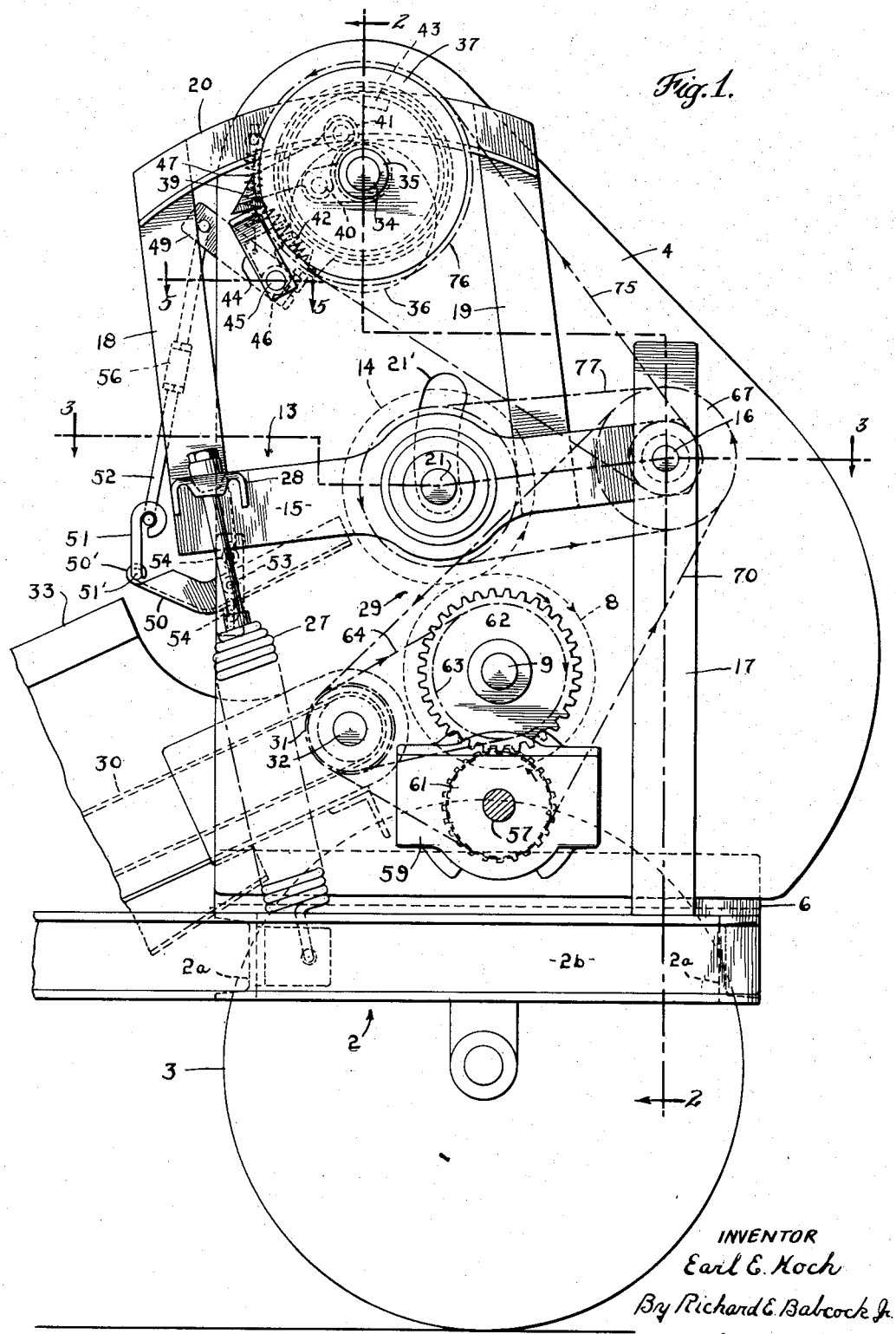

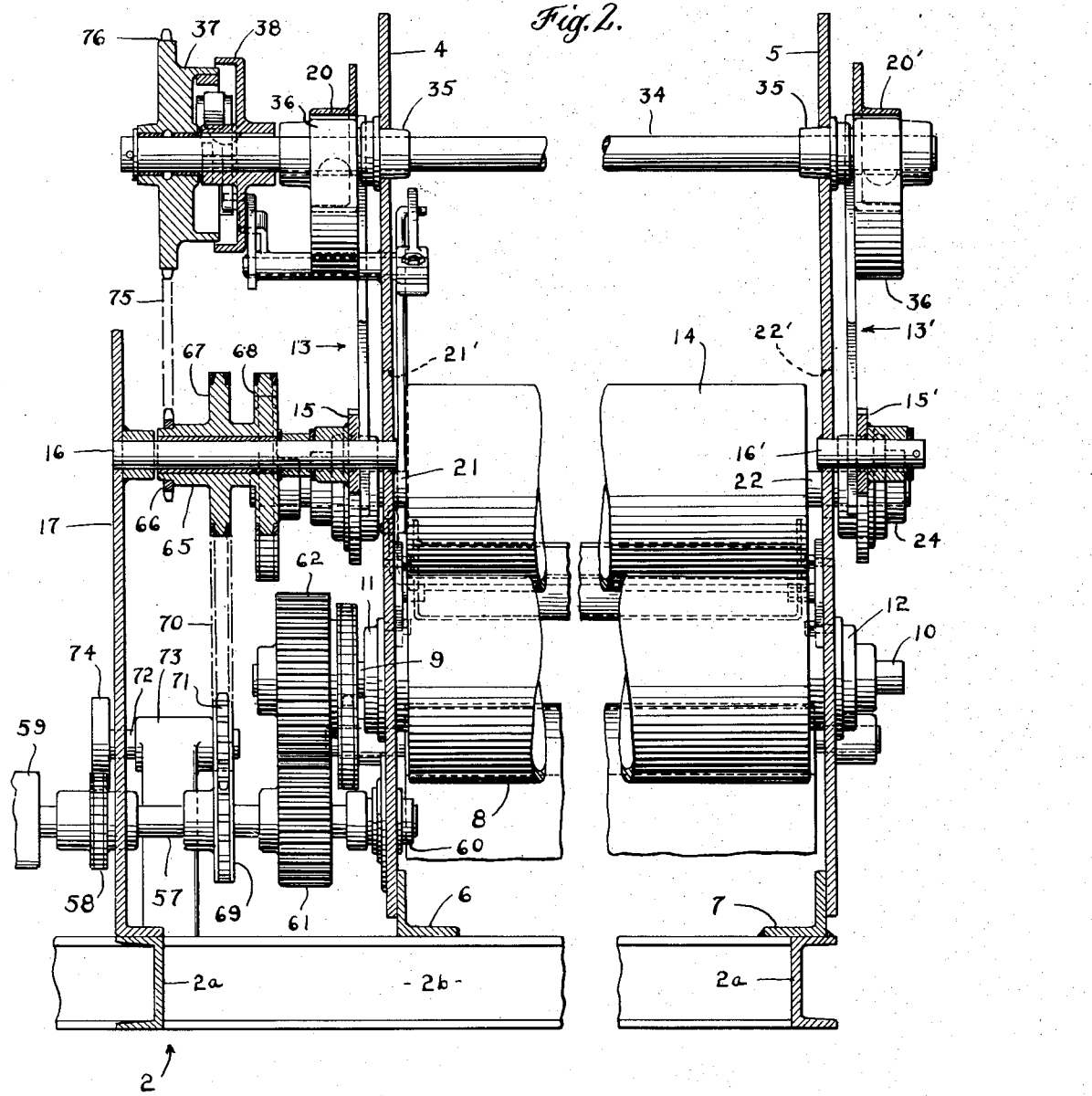

July 5, 1955     E. E. KOCH     2,712,282
HAY CRUSHER
Filed June 19, 1953     4 Sheets—Sheet 3
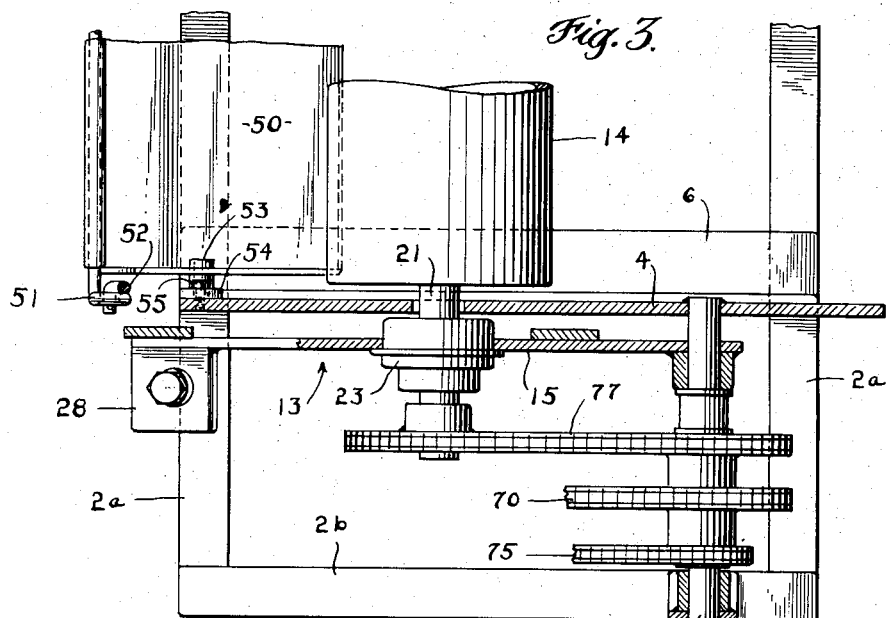
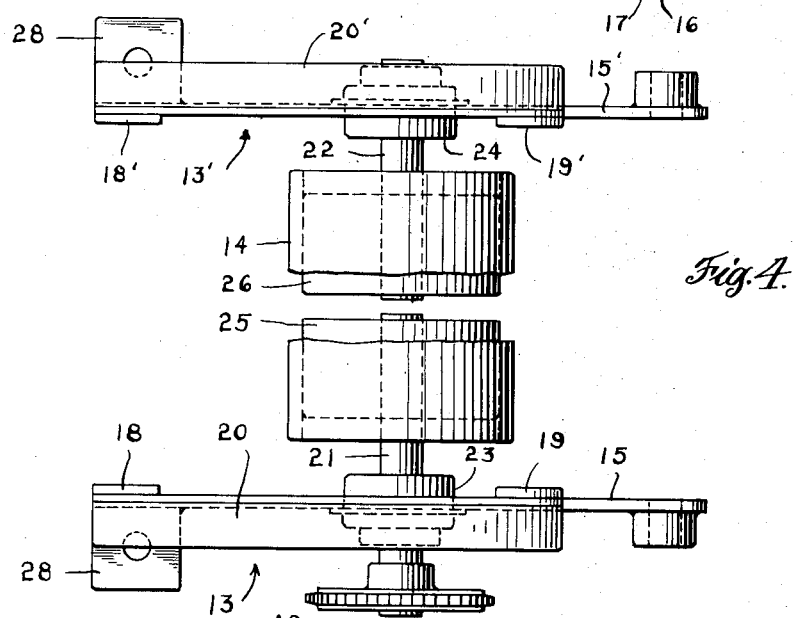
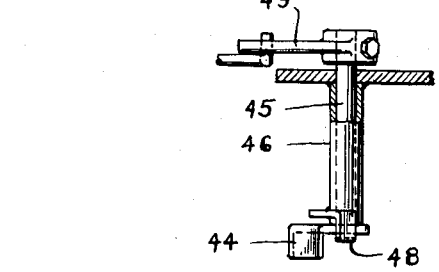
INVENTOR
Earl E. Koch
By Richard E. Babcock Jr.
ATTORNEY

United States Patent Office 2,712,282
Patented July 5, 1955

2,712,282

HAY CRUSHER

Earl E. Koch, Mohnton, Pa., assignor to The Sperry Corporation, New Holland, Pa., a corporation of Delaware Application June 19, 1953, Serial No. 362,879

5 Claims. (Cl. 100—47)

This invention relates to automatic roll separating mechanism which though capable of other uses is especially adapted for use in automatically separating the rolls of a hay crushing machine or the like to permit the passage between such rolls of abnormal accumulations of material such as might otherwise tend to clog them.

In hay crushing machines it is customary to employ cooperating presser rolls for cracking the stems of crop material which is fed between said rolls and to mount one of the rolls yieldably in order to accommodate varying quantities of material between them. In such machines there has been a tendency of the pressure rolls to become clogged upon accumulation of large quantities of crop material in front of them, which cannot force the rolls apart sufficiently to pass between them. This accumulation of material is often caused by obstruction of the presser rolls by foreign objects such as corn stalks, corn-cobs, and the like.

In order to avoid clogging of the rolls by such accumulated material, it has been customary to provide manually controllable mechanism for forcing the rolls apart to permit the accumulated material to pass between them. Such means however, have required constant watchfulness on the part of the operator who is generally also engaged in driving the tractor which tows the crushing machine around the field and thus must divide his attention between several tasks. Not only does the constant watching of the crusher rolls require the constant attention of the operator but it also involves the disadvantages that on the one hand he may fail to actuate the roll separating mechanism in time to prevent a serious clog up of the rolls, and on the other hand he may not restore the rolls to their normal operative positions in time to avoid passing an unnecessary quantity of uncrushed hay or other material between the rolls.

It is therefore the primary object of the present invention to provide automatic roll separating mechanism which is immediately responsive to abnormal accumulations of material in front of the rolls to separate the rolls and to permit the accumulated material to pass between them.

It is a further object to render such mechanism capable of restoring the rolls to their normal operative relationship immediately following the passage between the rolls of the accumulated material, so that all material thereafter passing between the rolls in normal volume will be properly crushed by them.

It is also an object to utilize as the actuating element of such mechanism a feeler which is disposed in advance of the rolls and which also functions as a holddown to guide material between the rolls.

Moreover it is an object to achieve a novel combination and mode of operation of such a feeler element with a conveyor and the controls of any suitable mechanism, whereby movement of the feeler responsive to variations in the thickness of the material on the conveyor will actuate such controls.

It is a still further object to provide a novel mounting for one of the crusher rolls which functions to support said roll for movement toward and away from the other crusher roll and in parallel relationship thereto at all times, as well as means cooperating with such mounting to separate the rolls.

In the preferred embodiment of the invention, the foregoing objects and advantages are achieved by mounting the upper roll on a sub-frame for swinging movement toward and away from the lower roll in the main crusher frame. A normally stationary cam shaft on the main frame has cams fixed thereon for operative engagement with the sub-frame to oscillate same responsive to rotation of the cam shaft. Rotation is transmitted to the cam shaft from a suitable constantly operating power source through a normally disengaged clutch, the control means of which are linked to the feeler element in such manner that movement of the feeler element responsive to abnormal accumulations of material in front of the rolls will actuate the control means to engage the clutch and separate the rolls. Return movement of the feeler element following removal of the abnormally accumulated material acts through the control means to immediately disengage the clutch and permit normal operation of the crusher rolls.

In the accompanying drawings wherein a preferred embodiment of the invention is illustrated:

Figure 1 represents an end elevation of a hay crushing machine looking toward the right in Figure 2 and with the main drive shaft in cross-section, the front portion of the machine including the pick-up means being broken away;

Figure 2, a cross-section taken substantially on the line 2—2 of Figure 1 with the central portion broken out to condense the figure;

Figure 3, a fragmentary plan section taken substantially on the line 3—3 of Figure 1;

Figure 4, a plan view of the sub-frame and the upper roll which is swingably carried by such frame, the central portion of the presser roll being broken away to permit condensation of the figure;

Figure 5, a fragmentary section on the line 5—5 of Figure 1; and,

Figure 6, a more or less diagrammatic view showing the feeler element raised responsive to an abnormal accumulation of hay in front of the presser rolls, such raising of the feeler element having initiated the operation of the roll separating mechanism with resulting separation of the presser rolls.

Referring now in detail to the accompanying drawings, the hay crushing machine of the preferred embodiment is supported on a rigid portable main frame designated 2 in its entirety, which comprises rigid interconnected transverse and longitudinal members 2a and 2b respectively lying in a horizontal plane. This frame is shown but fragmentarily in the accompanying drawings inasmuch as the details of the construction are conventional and constitute no part of the instant invention. The frame 2 is supported on wheels one of which is designated by the reference character 3 in Figure 1 for movement toward the left in Figure 1.

Included in the main frame structure are transversely spaced rigid side plates 4 and 5 which are respectively fixed to bracket members 6 and 7 on the frame 2 in parallel vertical planes. Rotatably supported in the main frame for rotation about a fixed horizontal axis is a lower crusher roll 8. The roll 8 is provided with axially projecting shafts 9 and 10 respectively fixed to the ends of the roll and rotatably supported on bearings 11 and 12 in their respective side plates.

Supported on the main frame 2 for vertical swinging movement about an axis parallel to that of roll 8 is a sub-frame including the two relatively symmetrical swingable members or sub-frame sections 13 and 13' which support the upper crusher roll 14 for vertical swinging movement generally radially toward and away from the lower roll 8 and in axially parallel relationship thereto.

The sub-frame section 13 includes a rigid arm 15 swingably supported on shaft 16 which is fixed horizontally between the side plate 4 and a standard 17 projecting upwardly from the frame 2 as shown in Figure 2. Fixed to and projecting upwardly from arm 15 are spaced uprights 18 and 19 which fixedly support a cam follower 20 above the arm 15.

The sub-frame section 13' is of identical but relatively reversed construction to the section 13, including the swingably rigid arm 15', uprights 18' and 19' and cam follower 20', all corresponding in function and arrangement with the parts designed by similar but unprimed reference characters in the description of sub-frame section 13.

Sub-frame section or member 13' is swingably supported by a shaft 16' fixed on side plate 5 in alignment with the shaft 16. Both of the shafts 16 and 16' are parallel to the rotational axis 9—10 of the lower drum 8 and jointly define the axis of vertical swinging movement of the sub-frame comprising the two sections 13 and 13'.

The upper crusher roll 14 has its axially projecting stub shafts 21 and 22 rotatably supported in bearings 23 and 24 disposed medially of the respective arms 15—15'. By reference to Figure 4 it will be seen that the upper crusher roll 14 is supported on internally disposed spiders 25 and 26 to which are respectively fixed the stub shafts or trunnions 21—22 above mentioned. The lower roll 8 may be identically constructed, though the specific roll structure is not important to the instant invention and is described merely by way of exemplification.

It will be noted that the stub shafts 21 and 22 of the upper roll are swingable through arcuate slots 21' and 22' respectively in the side plates 4 and 5. Resilient means such as the tension spring 27 in Figure 1 are connected between the main frame 2 and brackets 28 on each of the swingable members or sections 13—13' of the sub-frame to yieldingly urge the upper roll 14 toward the lower roll 8. The arrangement is such that the rolls 8 and 14 may be spread apart against the pull of the springs 27 to accommodate varying volumes or thicknesses of material.

In order to continuously deliver hay or other material to the mouth 29 of the feed rolls 8 and 14 for passage between these rolls, any conventional means may be employed. One exemplification of such means is illustrated fragmentarily in the accompanying drawings comprising a usual endless feed apron 30 having its delivery end supported around pulleys or rollers 31 fixed on a horizontal drive shaft 32 journalled between and supported by the respective side plates 4 and 5 of the main frame 2. This feed apron is preferably disposed and supported in a trough-like frame 33 which may be disposed for vertical floating or swinging movement about the axis of shaft 32 in accordance with conventional practice.

The rolls 8 and 14 will normally function to draw between them varying thicknesses of material and will spread apart or draw together under the influence of the springs 27 as may be required to accommodate such material. However, occasionally there will be encountered foreign objects or wads of material which are such size or character that the rolls are unable to obtain a sufficient frictional grip on them to draw such wads of material or objects between them, with the result that the rolls are clogged. Accordingly, there is provided power actuated roll separating mechanism which includes the normally stationary cam shaft 34 mounted for rotation in bearings 35—35 carried by the respective side plates 4 and 5 as in Figure 2. Fixed on the cam shaft 34 are cams 36—36 which in the present embodiment assumed the form of eccentric disks. These cams 36 are disposed in identical rotary positions on the shaft 34 in locations to operatively engage the cam followers 20—20' and cause simultaneous equal movement of their respective subframe sections 13—13'. Such equal and simultaneous actuation of the sub-frame sections will obviously maintain upper roll 14 at all times in axially parallel relation with the lower roll 8.

It will be seen that the shaft 34 is normally at rest with the cams 36—36 disposed in their lower-most position, whereby relative movement of the rolls 8 and 14 toward each other is limited only by the engagement of such rolls either with each other or with the material fed between them.

Obviously, the cooperating cams 36—36 and cam followers 20—20' exemplify merely the preferred form of various possible operative connections between the shaft and the swingable members 13—13'.

Suitable power drive means for the cam shaft 34 is exemplified by a conventional clutch of the well-known one revolution type (see Figures 2 and 6) including a constantly rotating driving member 37 rotatably journalled on the shaft 34 and a driven member 38 fixed on the shaft 34. In accordance with usual practice a trip lever 39 medially pivoted at 40 on the driven member 38, to be rotatable therewith and swingable thereon, carries at its inner end a roller 41, a spring 42 under tension between the outer lever and the fixed clutch member as in Figure 6 resiliently acting on the lever to swing said roller 41 into operative engagement with a radially inward projection or abutment 43 fixed to the driving member 37. Such engagement establishes a driving connection between the driving and driven clutch members.

Normally however, the outer end of the lever 39 abuts against the free end of a trip arm or detent 44 which maintains the lever 39 swung about its pivot 40 as in Figure 1 with the roller 41 at its inner end retracted radially inwardly out of engagement with the abutment 43 of the constantly rotating member. This of course permits the driven clutch member 38 to normally remain stationary while the driving member 37 rotates.

The detent 44 is in the form of a radial arm carried by a rock shaft 45 journalled through a sleeve 46 fixed on side plate 4. A spring 47 (Figure 1) connected between the detent 44 and cam follower 20 normally maintains the detent in its operative position against a stop 48 (see Figure 5) carried by the sleeve 46, with the free end of the detent in position to abut against the trip lever 39 and disconnect the clutch members as above mentioned.

A crank arm 49 fixed on the shaft 45 provides suitable means for rocking the shaft to move detent 44 out of engagement with trip lever 39 and permit the latter to operatively connect the driven and driving members 38 and 37 of the clutch. Thus the rock shaft 45 and its associated arms 44 and 49 constitute the control means for the clutch.

In accordance with the invention, a feeler element 50 mounted over the feed apron 30 adjacent the feed rolls 8 and 14 and movable responsive to variations in the thickness of the height of material therebeneath is operatively connected to the crank arm 49 through a linkage 51—52 to actuate the control means in response to movement of the feeler.

In the preferred embodiment the feeler 50 is in the form of a rigid plate substantially coextensive with the rolls 8 and 14, said plate being medially supported by pivots 53—53 carried by brackets 54—54 on the respective side plates 4 and 5 for rocking movement about a horizontal axis parallel to the rolls 8 and 14. Linkage member 51 in this embodiment comprises a rod having an angular disposed leg 51' journalled in the rolled forward edge or beading 50' of the plate 50. Linkage member 52 comprises a rectilinear link connecting member 51 to the crank arm 49 in obvious manner.

It will be seen that the feeler element 50 functions not only to automatically control the roll separating mechanism, but that it also functions as a holddown plate to direct the hay between the rolls 8 and 14 and prevent it from riding up over them.

In order to render the feeler element 50 adjustable so that it may be made to operate efficiently on different types of hay and under varying conditions, the brackets 54—54 which pivotally support the said element may be themselves supported for vertical adjustment by bolts 55 disposed through vertical slots in their respective side plates 4 and 5, as in Figure 1. To this same end the link 52 is preferably formed in two threaded sections connected by a turn buckle 56 whereby it may be shortened or lengthened as may be required to accommodate for vertical adjustment of the feeler element 50.

The foregoing mechanism may be driven in usual manner, as for instance through a drive shaft 57 coupled at 58 to the output shaft of a gear box 59 driven from the power-take-off of the tractor which propels the hay crushing machine. Drive shaft 57 is rotatably supported at one end in a bearing 60 in the adjacent frame side plate 4 and at its other end is supported by its coupling 58 to the gear box output shaft. It will be understood that the gear box 59 is supported on the main frame 2 in any suitable manner (not specifically illustrated).

A gear 61 keyed on drive shaft 57 meshes with a gear 62 keyed on stub shaft 9 of the lower presser roll 8 to impart rotation to roll 8, and a sprocket 63 rotatable with gear 62 transmits rotation through chain drive 64 to the apron drive shaft 32. The lower roll 8 and apron drive shaft 32 are rotated in the direction indicated in the arrows in Figure 1 to cause movement of the upper run of the apron toward the rolls 8 and 14.

Rotatably journalled on the shaft 16 is a sleeve 65 (Figure 2) having fixed thereon the sprockets 66—67 and 68. Said sleeve and sprockets are rotated from a sprocket 69 fixed on drive shaft 57 through a chain 70 operatively disposed around sprockets 69 and 67.

Preferably the chain 70 also passes around the drive sprocket 71 of a shaft 72 (Figure 2) rotatably supported in brackets 73 on the frame 2 to drive a power-take-off pulley 74 on said shaft. Inasmuch as the shaft 72 is axially aligned with the apron drive shaft 32 (constituting the swinging pivot for the frame 33 of the feed apron) it may be employed as the source of driving power for a mower or pick-up mechanism or other power driven mechanism carried by said frame.

The constantly rotating clutch member 37 is driven from a sprocket 66 by a chain 75 disposed around the sprocket 76 formed integrally with said member. The upper roll 14 is driven from the sprocket 68 through a chain 77 and sprocket 78 keyed on the stub shaft 21 of said upper roll. It will be noted of course that the sprockets 66 and 68 are located at the axis of swinging movement of the frame members 13 and 13' and the respective shafts 21 and 34, to thereby maintain an operating driving connection to said shafts 21 and 34 at all times.

In the operation of the invention which is believed to be apparent from the foregoing description, it will be seen that the feed apron 30 functions to deliver a more or less constant supply of hay beneath the feeler element 50 to the mouth 29 of the crusher rolls 8 and 14, for passage between such rolls. The springs 27 acting on the respective sub-frame sections or swingable members 13 and 13' normally permit upward yielding of the upper roll 14 to accommodate increased volumes or thicknesses of material between the rotating rolls 8 and 14. However when the rolls become blocked by an object which cannot be readily gripped and drawn between them or by an unusually large wad or mass of hay or the like, it will be seen that the feed apron 30 will nevertheless continue to deliver hay to the mouth of the rolls and as shown in Figure 6 this hay, designated H, will tend to pile up in front of the rolls 8 and 14, thereby pressing against and tilting the overlying feeler element 50. Such tilting of the feeler element 50 is transmitted through the linkage 51—52 to the control arm 49 for the detent 44, to withdraw the detent 44 from engagement with the clutch lever 39, whereupon the ensuing interconnection of the driven member 38 with the driving member 37 of the clutch will rotate the cam shaft 34 and the cams 36 thereon will act in cooperation with the cam followers 20 to simultaneously oscillate the swingable members or sub-frame section 13 or 13'. This will of course cause a repeated raising and lowering of the upper roll 14 which will continue until the abnormal accumulation of material beneath the feeler element 50 is drawn between the rolls 8 and 14, immediately following which the element 50 will return to its normal position. The return movement of the element 50 will act through the linkage 51—52 and the control arm 49 to permit return of the detent 44 to its operative position under the influence of spring 47. Therefore on the ensuing revolution of the driven member 38 its trip lever 39 will abut against the detent 44 to disengage the two clutch members 37 and 38 and to discontinue the rotary movement of the shaft 44 with the cams 36—36 positioned as shown in Figure 1. Thus the detent 44 is positioned to disrupt the driving connection only in a rotational position of lever 39 and cams 36—36 wherein the upper roll is permitted to return toward the lower roll.

Thus by virtue of the invention, the crusher rolls 8 and 14 will be separated immediately whenever the need arises because of abnormal accumulations of material in front thereof and will be returned to their normal operative position immediately after such accumulated material has passed between them. This all is done of course without any attention whatsoever from the operator, though if for any reason the operator should desire to manually actuate the roll separating mechanism this may be easily accomplished by manual actuation of the control arm 49 in obvious manner.

In this application I have shown and described only the preferred embodiment of my invention simply in order to illustrate the preferred mode of carrying out my invention. However, I recognize that the invention may be modified in various ways and accordingly the drawings and description herein are to be understood as being merely illustrative in nature and not as excluding other modifications and embodiments.

Having thus described my invention, I claim:

1. A hay crusher comprising a portable main frame, a first roll mounted in said frame for rotation about a horizontal axis, a member swingable on said main frame generally radially to said roll, a second roll having one end rotatably carried by said member for movement relative to the first roll, resilient means connected between the main frame and said member and urging said member and said second roll toward the first roll, and feed means operative to deliver material between said rolls, in combination with roll separating mechanism comprising a cam rotatable on said main frame in operative engagement with said member to oscillate said member toward and away from the first roll, a driven clutch member rotatable with said cam, a driving clutch member on said main frame, a lever carried by said driven member and swingable to operative position to establish a driving connection between said driving and driven members, means resiliently urging said lever toward operative position, a detent pivoted on said main frame and having a free end normally abutting against said lever and holding same in inoperative position out of engagement with the driving member in a rotational position of said cam wherein the rolls are permitted to move toward each other, and a deflectable feeler element mounted on said main frame for floating movement in engagement with the material on said feed means adjacent said rolls, said element being operatively connected to the said detent to swing the free end thereof out of abutment with said lever responsive to movement imparted to said element by abnormal accumulations of material on the infeed side of said rolls, and to permit return of the detent into the rotational path of said lever responsive to removal of such abnormal accumulation of material.

2. A hay crusher comprising a frame, a first roll mounted in said frame for rotation about a horizontal axis, a second roll and means for supporting same in the frame for rotation about an axis parallel to that of the first roll and for generally radial movement relative to said first roll, resilient means urging said second roll generally radially toward the first roll, and feed means operative to deliver material between said rolls, in combination with automatic roll separating mechanism comprising a driven rotatable clutch member, mechanism interconnecting said driven clutch member and said second roll to move the latter away from and permit the return thereof toward the first roll in different rotational positions of said driven clutch member, a constantly rotating driving clutch member carried by said frame, a lever carried by and rotatable with said driven clutch member and swingable on said driven clutch member between an operative position wherein it establishes a driving connection between said driving and driven members and an inoperative position wherein said connection is disrupted, means resiliently urging said lever toward operative position, and a detent movable into the rotational path of said lever for swinging the lever to inoperative position, said detent being positioned to disrupt said driving connection only in a rotational position of the lever wherein said interconnecting means is conditioned to permit return of the second roll toward the first roll.

3. The combination of claim 2 including a feeler element mounted on the main frame for floating movement over said feed means in operative engagement with the material thereon, said element being operatively connected to the detent to move same out of the rotational path of said lever responsive to movement imparted to said element by abnormal accumulations of hay on the feed means and to return said detent into the rotational path of said lever responsive to removal of said abnormal accumulations.

4. A hay crusher comprising a frame, a first roll mounted on said frame for rotation about a horizontal axis, a second roll and means supporting same on the frame for rotation about an axis parallel to that of the first roll and for generally radial movement relative to said first roll, resilient means urging said second roll generally radially toward the first roll, in combination with automatic roll separating mechanism comprising a driven rotatable clutch member, mechanism interconnecting said driven clutch member and said second roll to move the latter away from and permit its return toward the first roll, respectively, in different rotational positions of said driven clutch member, a constantly rotating driving clutch member carried by said frame, a lever carried by and rotatable with said driven clutch member and swingable on said driven clutch member between an operative position wherein it establishes a driving connection between said driving and driven members and an inoperative position wherein said connection is disrupted, means resiliently urging said lever toward operative position, a detent moveable into the rotational path of said lever for swinging the lever to inoperative position, said detent being positioned to disrupt said driving connection only in a rotational position of the lever wherein said interconnecting means is conditioned to permit return of the second roll toward the first roll, and a feeler element mounted on the main frame for floating movement in operative engagement with the material passing between said rolls, said element being operatively connected to the detent to move same out of the rotational path of said lever responsive to movement imparted to said element by abnormal accumulation of hay passing between said rolls.

5. A hay crusher comprising a frame, a first roll mounted on said frame for rotation about a horizontal axis, a second roll and means supporting same in the frame for rotation about an axis parallel to that of the first roll and for generally radial movement relative to the first roll, and resilient means urging said second roll generally radially toward the first roll, in combination with automatic roll separating mechanism comprising a driven rotatable clutch member, mechanism interconnecting said driven clutch member and said second roll to move the latter away from and permit its return toward the first roll respectively in different rotational positions of said driven clutch member, a constantly rotating driving clutch member carried by said frame, a connecting element carried by and rotatable with said driven clutch member and moveable on said driven clutch member between a position wherein it establishes a driving connection between said driving and driven members, and an inoperative position wherein said connection is disrupted, means resiliently urging said element toward operative position, and a detent moveable into the rotational path of said element for moving the latter into inoperative position, said detent being positioned to disrupt said connection only in a rotational position of the element wherein said interconnecting means is positioned to permit return of the second roll toward the first roll.

References Cited in the file of this patent

UNITED STATES PATENTS

| 179,121 | Mackh | June 27, 1876 |
| 975,388 | Averbeck | Nov. 15, 1910 |
| 1,220,620 | Freeman | Mar. 27, 1917 |
| 1,537,864 | Morin | May 12, 1925 |
| 2,227,119 | Behan | Dec. 31, 1940 |
| 2,345,715 | Reed | Apr. 4, 1944 |

FOREIGN PATENTS

| 110,930 | Germany | May 26, 1900 |
| 130,475 | Australia | Dec. 3, 1948 |